United States Patent [19]

Shine

[11] Patent Number: 4,787,242

[45] Date of Patent: Nov. 29, 1988

[54] MEASURING PISTON STEADY-STATE TEMPERATURES

[75] Inventor: John K. Shine, El Cerrito, Calif.

[73] Assignee: Chevron Research Company, San Francisco, Calif.

[21] Appl. No.: 75,930

[22] Filed: Jul. 21, 1987

[51] Int. Cl.⁴ .............................................. G01M 15/00
[52] U.S. Cl. .................................. 73/119 R; 374/144
[58] Field of Search ...................... 73/119 R; 374/144; 123/193 CP, 193 P

[56] References Cited

U.S. PATENT DOCUMENTS 3,285,717  11/1966  Fischer ........................... 420/534 X
4,432,313  2/1984  Matlock ........................... 123/193 P Primary Examiner—Jerry W. Myracle
Attorney, Agent, or Firm—S. R. La Paglia; E. J. Keeling; E. A. Schaal

[57] ABSTRACT

An apparatus is disclosed for calculating the steady-state temperatures experienced by an Aluminum-Silicon piston. That piston has incorporated therein an Aluminum-Copper alloy device, such as a band integrally cast within the piston, a setscrew, or an installable wedge that is press-fit into the piston. Preferably, that alloy is a 3.5% to 4.5% Aluminum-Copper alloy that meets the requirements of Aluminum Association Alloy 242 that has been tailored to provide temperature information within 3° C. over the temperature range of from 175° C. to 375° C. The steady-state temperature experienced by a piston in an oil qualifying run is calculated by subjecting the piston to an oil qualifying run of at least one hundred hours, testing the hardness of the apparatus, and calculating the steady-state temperature by reference to a calibration curve.

6 Claims, 2 Drawing Sheets

FIG_1

MEASURING PISTON STEADY-STATE TEMPERATURES

The present invention relates to an apparatus and a method for measuring steady-state temperatures of pistons.

BACKGROUND OF THE INVENTION

Lubrication of diesel pistons is needed for a variety of reasons: to provide cooling, to control friction and wear, and to remove particulate material such as wear debris. During this process, thin films of lubricant are exposed to high thermal loads which can lead to deposit formation on piston lands and in ring grooves. Excessive piston deposits are undesirable because they tend to interfere with proper ring operation.

In developing lubricating oils that can withstand those high thermal loads, it is important to know exactly what those thermal loads are (i.e., the "steady-state temperature"). By "steady-state temperature," we mean the equilibrium temperature configuration of an engine system, such as in a non-cyclic ASTM standardized lubricant qualifying run. One way of measuring those loads is by measuring the piston hardness and relating hardness to temperature by a suitable calibration curve. (See "Microstructure of Carbonaceous Diesel Engine Piston Deposits," ASLE Preprint No. 87-AM-5D-3, which is incorporated herein by reference for all purposes.)

Although once quite popular, the use of Aluminum-Copper alloys in piston manufacture appears to be waning in favor of Aluminum-Silicon alloys. By "Aluminum-Copper alloy," we mean a mix of materials, predominantly Aluminum, and containing Copper as the principal alloying element. By "Aluminum-Silicon alloy," we mean a mix of materials, predominantly Aluminum, and containing Silicon as the principal alloying element. The Aluminum-Silicon alloys, while exhibiting many superior performance characteristics to their predecessors, do not yield much temperature information by hardness analysis.

SUMMARY OF THE INVENTION

The present invention is an apparatus and a method for calculating the steady-state temperatures experienced by a piston. The apparatus is an Aluminum-Copper alloy device incorporated into the piston. That device can be a band integrally cast within the piston, a setscrew, or an installable wedge that is press-fit into the piston. Preferably, the Aluminum-Copper alloy is a 3.5% to 4.5% Aluminum-Copper alloy that meets the requirements of Aluminum Association Alloy 242. Preferably, the Aluminum-Copper alloy has been tailored to provide temperature information within 3° C over the temperature range of from 175° C. to 375° C. The steady-state temperature experienced by a piston in an oil qualifying run is calculated by subjecting the piston to an oil qualifying run of at least one hundred hours, testing the hardness of the apparatus, and calculating the steady-state temperature by regression analysis from data of determinations of hardness for samples cooked at known temperatures.

BRIEF DESCRIPTION OF THE DRAWINGS

In order to facilitate the understanding of this invention, reference will now be made to the appended drawings of preferred embodiments of the present invention. The drawings are exemplary only, and should not be construed as limiting the invention.

DETAILED DESCRIPTION OF THE PREFERRED EMBODIMENTS

Figure 2:
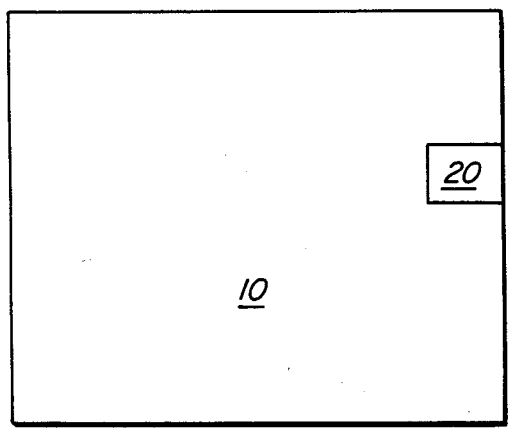
FIG. 2 is a drawing of a preferred embodiment of the present invention.

In its broadest aspect, the present invention is an apparatus and method for the calculation of the steadystate temperatures experienced by a piston. The piston has incorporated therein an Aluminum-Copper alloy device. Referring to FIG. 2, piston 10 has incorporated therein Aluminum-Copper alloy device 20.

The Aluminum-Copper alloy device can be incorporated in the piston in a variety of ways, such as a band integrally cast within the piston, a setscrew, or an installable wedge that is press-fit into the piston. The device functions on the principle of precipitation hardening of the Aluminum-Copper alloy.

In a first embodiment of the present invention, a band of Aluminum-Copper alloy is integrally cast within an Aluminum-Silicon piston. By "band," we mean an annulus of temperature-sensitive material having an exposed surface area. By "integrally cast," we mean that the annulus has been made a part of the finished piston, i.e., no drilling, tapping, or other modification is required.

In a second embodiment of the present invention, a setscrew made from an Aluminum-Copper alloy is incorporated within an Aluminum-Silicon piston. By "setscrew," we mean a diminutive, threaded cylindrical specimen. The setscrews of the present invention give better temperature/hardness resolution than conventional setscrews of steel.

In a third embodiment of the present invention, an installable wedge mad from an Aluminum-Copper alloy is press-fit into an Aluminum-Silicon piston. By "press-fit," we mean the forcible installation of an oversized piece within a cavity. Sometimes this is done by cooling the installable piece or heating the cavity.

Preferably, the Aluminum-Copper alloy is a 3.5% to 4.5% Aluminum-Copper alloy. By "3.5% to 4.5% Aluminum-Copper alloy," we mean a mix of materials, predominantly Aluminum, and containing from 3.5% to 4.5% by weight Copper as the principal alloying element. More preferably, the Aluminum-Copper alloy meets the requirements of Aluminum Association Alloy 242. Those requirements are given in Table I.

TABLE I

| REQUIREMENTS OF ALUMINUM ASSOCIATION ALLOY 242 | | | |
|---|---|---|---|
| | | Minimum | Maximum |
| Aluminum | (Al) | Remainder | |
| Chromium | (Cr) | — | 0.25 |
| Copper | (Cu) | 3.5 | 4.5 |
| Iron | (Fe) | — | 1.0 |
| Magnesium | (Mg) | 1.2 | 1.8 |
| Manganese | (Mn) | — | 0.35 |
| Nickel | (Ni) | 1.7 | 2.3 |
| Silicon | (Si) | — | 0.7 |
| Titanium | (Ti) | — | 0.25 |
| Zinc | (Zn) | — | 0.35 |
| Others Each | | — | 0.05 |
| Others Total | | — | 0.15 |

Preferably, the Aluminum-Copper alloy has been tailored to provide temperature information within 3°

C. over the temperature range of from 175° C. to 375° C. By "tailored to provide temperature information," we mean the optimization of the alloy mix to optimize the resolution of hardness versus temperature.

The apparatus of the present invention is used to calculate the steady-state temperature experienced by a piston in an oil qualifying run by subjecting the piston that incorporates the Aluminum-Copper alloy device to an oil qualifying run of at least one hundred hours, testing the hardness of the Aluminum-Copper alloy device, and calculating the steady-state temperature by reference to a calibration curve developed by regression analysis from data of determinations of hardness for samples cooked at known temperatures.

Figure 1:
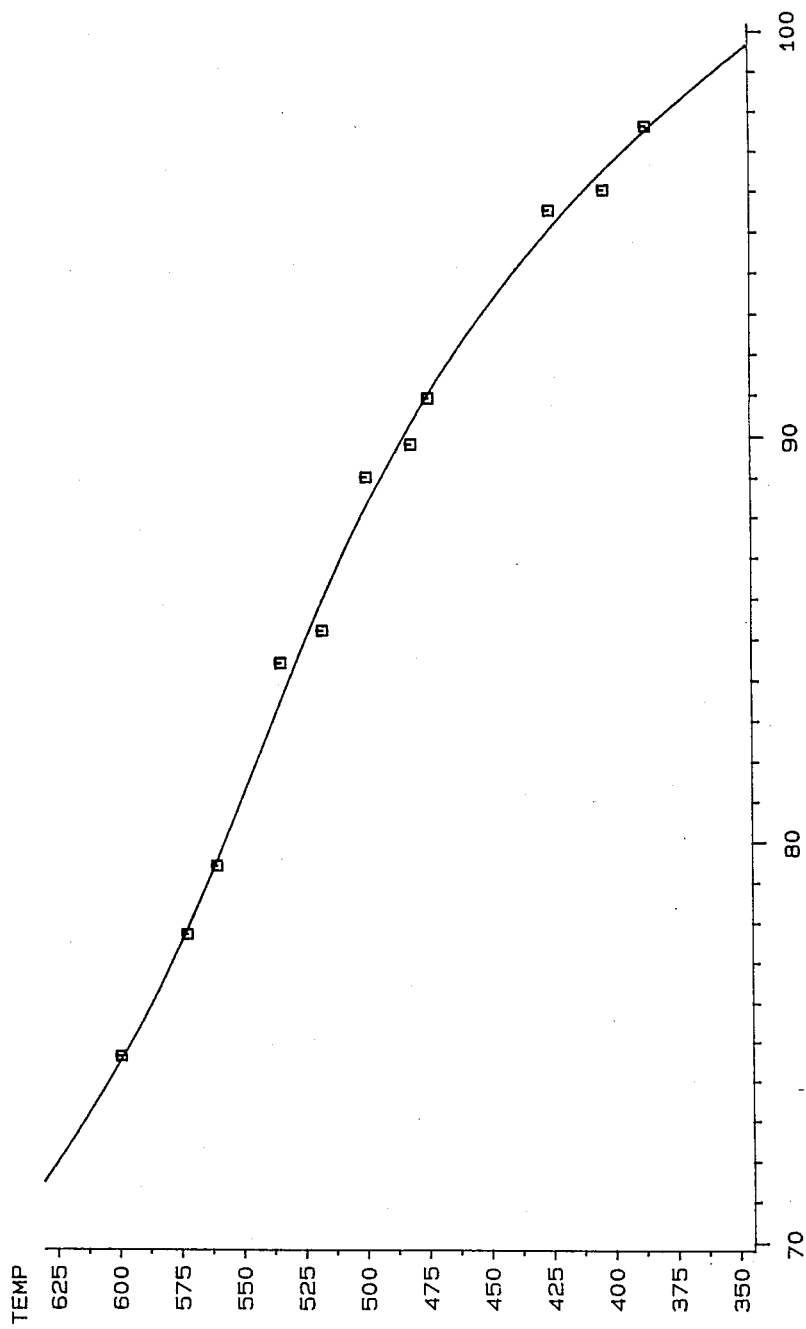
FIG. 1 is graph of temperature as a function of hardness for a mix of an Aluminum-Copper alloy.

Such a calibration curve is shown in FIG. 1, which shows a graph of hardness vs. temperature for a given mix of an Aluminum-Copper alloy.

Preferably, the steady-state temperatures experienced by a piston fabricated from an Aluminum-Silicon alloy in non-cyclic oil qualifying runs is calculated to within 3° C. over the temperature range of from 175° C. to 375° C. which is insensitive to the time of exposure for times greater than 100 hours during said runs. This is accomplished by integrally casting within the piston a band of Aluminum-Copper alloy that meets the requirements of Aluminum Association Alloy 242 that has been tailored to provide temperature information within 3° C. over the temperature range of from 175° C. to 375° C., subjecting the piston to an oil qualifying run of at least one hundred hours, testing the hardness of the Aluminum-Copper alloy band, and calculating the steady-state temperature by reference to a calibration curve.

While the present invention has been described with reference to specific embodiments, this application is intended to cover those various changes and substitutions which may be made by those skilled in the art without departing from the spirit and scope of the appended claims.

What is claimed is:

1. An apparatus for the calculation of the steady-state temperature experienced by a piston comprising an Aluminum-Copper alloy device incorporated into said piston, wherein said Aluminum-Copper alloy device is a setscrew made from an Aluminum-Copper alloy.

2. An apparatus for the calculation of the steady-state temperatures experienced by a piston comprising an Aluminum-Copper alloy device incorporated into said piston, wherein said Aluminum-Copper alloy device is an installable wedge made from an Aluminum-Copper alloy, wherein said installable wedge is press-fit into said piston.

3. An apparatus for the calculation of the steady-state temperatures experienced by a piston comprising an Aluminum-Copper alloy device incorporated into said piston, wherein said Aluminum-Copper alloy is a 3.5% to 4.5% Aluminum-Copper alloy, and wherein said Aluminum-Copper alloy has been tailored to provide temperature information within 3° C. over the temperature range of from 175° C. to 375° C.

4. An apparatus for the calculation of the steady-state temperatures experienced by a piston comprising an Aluminum-Copper alloy device incorporated into said piston, wherein said piston is fabricated from an Aluminum-Silicon alloy and wherein said Aluminum-Copper alloy device is a band of Aluminum-Copper alloy that meets the requirements of Aluminum Association Alloy 242 that has been tailored to provide temperature information within 3° C. over the temperature range of from 175° C. to 375° C. integrally cast within said piston.

5. A method of calculating the steady-state temperature experienced by a piston in an oil qualifying run, wherein said piston has incorporated therein an apparatus for the calculation of the steady-state temperature experienced by a piston comprising an Aluminum-Copper alloy device incorporated into said piston, said method comprising:
    (a) subjecting said piston to an oil qualifying run of at least one hundred hours;
    (b) testing the hardness of said apparatus; and
    (c) calculating the steady-state temperature by reference to a calibration curve.

6. A method of calculating the steady-state temperatures experienced by a piston fabricated from an Aluminum-Silicon alloy in non-cyclic oil qualifying runs within 3° C. over the temperature range of from 175° C. to 375° C which is insensitive to the time of exposure for times greater than 100 hours during said runs, said method comprising:
    (a) integrally casting within said piston a band of Aluminum-Copper alloy that meets the requirements of Aluminum Association Alloy 242 that has been tailored to provide temperature information within 3° C. over the temperature range of from 175° C. to 375° C.;
    (b) subjecting said piston to an oil qualifying run of at least one hundred hours;
    (c) testing the hardness of said apparatus; and
    (d) calculating the steady-state temperature by reference to a calibration curve developed by regression analysis from data of determinations of hardness for samples cooked at known temperatures.

* * * * *